United States Patent
Bakulin et al.

(10) Patent No.: US 10,908,307 B2
(45) Date of Patent: Feb. 2, 2021

(54) EVALUATING PROCESSING IMPRINT ON SEISMIC SIGNALS

(71) Applicant: Saudi Arabian Oil Company, Dhahran (SA)

(72) Inventors: Andrey Bakulin, Dhahran (SA); Robert Smith, Dhahran (SA); Abdullah Alramadhan, Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 300 days.

(21) Appl. No.: 15/968,261

(22) Filed: May 1, 2018

(65) Prior Publication Data

US 2019/0339405 A1 Nov. 7, 2019

(51) Int. Cl.
*G01V 1/28* (2006.01)
*G01V 1/34* (2006.01)

(52) U.S. Cl.
CPC .............. *G01V 1/282* (2013.01); *G01V 1/345* (2013.01); *G01V 2210/74* (2013.01)

(58) Field of Classification Search
CPC ......... G01V 1/345; G01V 1/282; G01V 1/306
See application file for complete search history.

(56) References Cited

U.S. PATENT DOCUMENTS

| 8,483,964 B2 | 7/2013 | Chu |
| 8,908,474 B2 | 12/2014 | Chu et al. |
| 2011/0213556 A1* | 9/2011 | Yu .......................... G01V 1/368 |
| | | 702/14 |
| 2013/0033961 A1 | 2/2013 | Burnstad |

OTHER PUBLICATIONS

International Search Report and Written Opinion issued in International Application No. PCT/US2019/027604 dated Jul. 1, 2019, 16 pages.
Nguyen et al., "A review on time-lapse seismic data processing and interpretation," Geosciences Journal, vol. 19, No. 2, Jun. 1, 2015, 18 pages.

(Continued)

*Primary Examiner* — Bryan Bui
(74) *Attorney, Agent, or Firm* — Fish & Richardson P.C.

(57) ABSTRACT

A method of evaluating processing imprint on seismic signals includes receiving a first and a second seismic dataset of a reservoir. A first and a second synthetic dataset are generated, where the second synthetic dataset is generated by multiplying at least a portion of data in the first synthetic dataset by a scaling factor. A first and a second combined dataset are generated by adding the respective seismic dataset and the respective synthetic dataset. A first and a second processed dataset are generated by applying a seismic processing step on the first and the second combined dataset, respectively. A difference factor between the first and the second processed dataset is calculated. Based on the difference factor and the scaling factor, it is determined whether the seismic processing step is able to preserve signal amplitude changes between the first and the second seismic dataset.

17 Claims, 7 Drawing Sheets

(4 of 7 Drawing Sheet(s) Filed in Color)

(56) References Cited

OTHER PUBLICATIONS

Kelly, "Processing and interpretation of time-lapse seismic data from a heavy oil field," retrieved from URL<https://www.crewes.Org/ResearchLinks/GraduateTheses/2012/Kelly MSc_2012.pdf>, a Thesis Submitted to the Faculty of Graduate Studies in Partial Fulfilment of the Requirements for the Degree of Master or Science, Department of Geoscience, Calgary, Alberta, Nov. 1, 2012, 176 pages.

GCC Examination Report in GCC Appln. No. GC 2019-37470, dated Apr. 13, 2020, 4 pages.

\* cited by examiner

EVALUATING PROCESSING IMPRINT ON SEISMIC SIGNALS

TECHNICAL FIELD

This disclosure relates to seismic data processing.

BACKGROUND

Seismic data can be collected for a target region including one or more subsurface layers by sending seismic waves to the target region at multiple source locations and recording reflected waves at multiple receiver locations. The seismic data can be used to build seismic images for analyzing subsurface structure or lithology of the target region so that effective oil and gas exploration can be performed.

SUMMARY

The present disclosure describes methods for evaluating processing imprint on seismic signals.

In an implementation, a first seismic data set and a second seismic data set of a reservoir are received. A first synthetic data set and a second synthetic data set are generated, where the second synthetic data set is generated by multiplying at least a portion of data in the first synthetic data set by a scaling factor. A first combined data set and a second combined data set are generated, where the first combined data set is generated by adding the first seismic data set and the first synthetic data set, and the second combined data set is generated by adding the second seismic data set and the second synthetic data set. A first processed data set and a second processed data set are generated by applying a seismic processing step on the first combined data set and the second combined data set, respectively. A difference factor between the first processed data set and the second processed data set is calculated. Based on the difference factor and the scaling factor, it is determined whether the seismic processing step is able to preserve signal amplitude changes between the first seismic data set and the second seismic data set.

In some cases, the described approach evaluates the impact of a seismic processing workflow or step on a final subsurface image by adding data of a synthetic event of known amplitudes to real field data. The combined data set is processed using the seismic processing workflow or step to determine how well the amplitudes of the known synthetic event are preserved. The described approach can be applied to time-lapse seismic processing (that is, four-dimensional (4D) seismic processing) for determining whether a seismic processing workflow or step can preserve a 4D signal. The described approach can also be used to other types of seismic processing (such as three-dimensional (3D) seismic processing) when the fidelity of amplitudes are of concern.

The subject matter described in this specification can be implemented in particular implementations, so as to realize one or more of the following advantages. The described approach can be used to identify seismic processing workflows that can preserve seismic amplitude changes. Processing workflows that preserve signal changes can be used to improve the quality of final subsurface images and provide a better interpretation in subsurface structure or lithology. The better interpretation in subsurface structure or lithology enables efficient oil and gas exploration, for example, identifying potential locations for hydrocarbon wells and determining (or adjusting) drilling parameters of the hydrocarbon wells.

The details of one or more implementations of the subject matter of this specification are set forth in the detailed description, the claims, and the accompanying drawings. Other features, aspects, and advantages of the subject matter will become apparent to those of ordinary skill in the art from the detailed description, the claims, and the accompanying drawings.

DESCRIPTION OF DRAWINGS

The patent or application file contains at least one drawing executed in color. Copies of this patent or patent application publication with color drawing(s) will be provided by the Patent and Trademark Office upon request and payment of the necessary fee.

Like reference numbers and designations in the various drawings indicate like elements.

DETAILED DESCRIPTION

The following detailed description describes methods for evaluating processing imprint on seismic signal amplitudes. Processing imprint refers to effects of seismic data processing on seismic data. This disclosure is presented to enable any person skilled in the art to make and use the disclosed subject matter in the context of one or more particular implementations. Various modifications, alterations, and permutations of the disclosed implementations can be made and will be readily apparent to those of ordinary skill in the art. The general principles defined in this disclosure can be applied to other implementations and applications without departing from the scope of the disclosure. Thus, the present disclosure is not intended to be limited to the described or illustrated implementations, but is to be accorded the widest scope consistent with the principles and features disclosed in this disclosure.

Seismic data or seismic traces can be recorded and processed for generating seismic images. Seismic images can be used to extract information about earth subsurface geology and fluids. For generating seismic images, a seismic processing workflow (or seismic data processing) can be applied on the recorded seismic data, for example, to suppress noise or to remove imprint from acquisition and near surface. Imprint from acquisition can be related to an acquisition geometry, such as locations of sources and receivers. For instance, when sources and receivers are at different elevation levels, the recorded seismic data can be corrected for the elevation differences so that the sources and receivers are at a same elevation level. Imprint from the near surface can include unwanted waves related to the earth surface that may not contain information of the earth subsurface. For instance, the recorded seismic data can be processed to remove scattered, refracted, or reflected waves in the near surface or airwaves that travel directly from sources to receivers. In some cases, a seismic processing workflow can include one or more steps such as deconvolution, normal moveout correction, statics correction, residual statics correction, stacking, and migration.

While the seismic data processing can suppress noise or remove imprint from acquisition and near surface, the seismic processing may also impact useful signal components, such as changing signal amplitudes. In some cases, a time-lapse seismic survey (also called four-dimensional (4D) seismic survey, where the fourth dimension is time) repeats three-dimensional (3D) seismic surveys of a reservoir to generate snapshots of the subsurface at different times. By comparing the data sets of different surveys, the time-lapse seismic method can monitor reservoir changes over time, for example, changes in reservoir fluid saturation or pressure as a result of hydrocarbon production or injection of water or gas into the reservoir. Signal amplitude and event timing variations between surveys (also known as 4D signals) caused by, for example, changes in reservoir fluid saturation or pressure, are of interest. However, due to changes in acquisition geometry, seismic source signature, or near surface properties from survey to survey, differences between surveys include not only 4D signals representing changes in the reservoir, but also 4D noises representing changes unrelated to the reservoir (such as changes due to acquisition geometry, seismic source signature, or near surface properties).

When applying a seismic processing workflow on 4D seismic data of a time-lapse seismic survey, the data set of each survey is processed by that seismic processing workflow, and the processed data of multiple surveys are compared to determine the 4D signals. In some cases, the 4D noises can be accounted for during the application of the seismic processing workflow. For example, when processing the data set of each survey, the data set can be corrected so that a common acquisition geometry is applied across multiple surveys. Various seismic processing workflows are developed for 3D seismic imaging, and whether a seismic processing workflow is 4D compliant (a processing flow is 4D compliant if the processing workflow can preserve signal changes from survey to survey) is usually unknown. For example, the true reflection coefficient of a point in the earth subsurface is increased by x % from survey 1 to survey 2. After applying the processing workflow on the data sets of survey 1 and survey 2, seismic images for survey 1 and survey 2 can be generated. It is desirable that the generated seismic images can indicate that the reflection coefficient has changed x % from survey 1 to survey 2.

The described approach can assess the impact of a seismic processing workflow on final subsurface images, for example, assessing whether that processing workflow can preserve the 4D signal (or signal amplitude changes between two data sets). Data of a synthetic event with a known amplitude is generated and added to the real field data (that is, recorded seismic data). The combined data is processed using the seismic processing workflow. After each step of the processing workflow, the output data is assessed to determine how well the amplitudes of the known synthetic event are preserved. If a certain step is found to significantly reduce the fidelity of the amplitudes of the known synthetic event, that step is not incorporated in the final processing workflow. The described approach can be applied to time-lapse seismic processing, and also can be used to other types of seismic processing when the fidelity of amplitudes are of concern. The described approach may not handle surface-consistent processing steps. In other words, the described approach may not be able to assess whether a surface-consistent processing step can preserve signal amplitude changes.

Figure 1:
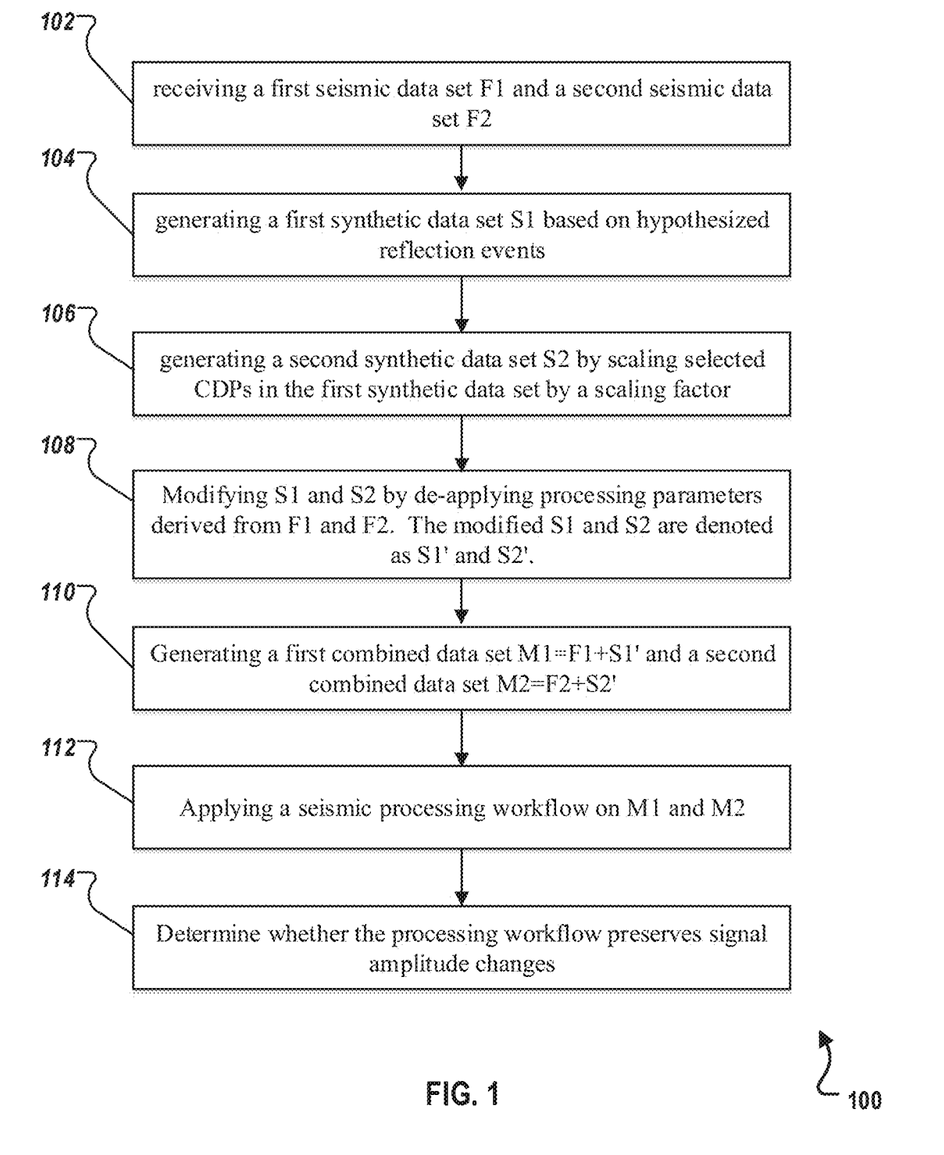
FIG. 1 is a flowchart illustrating an example of a computer-implemented method for evaluating processing imprint on seismic signals, according to some implementations of the present disclosure.

FIG. 1 is a flowchart illustrating an example of a computer-implemented method 100 for evaluating processing imprint on seismic signals, according to some implementations of the present disclosure. For clarity of presentation, the description that follows generally describes method 100 in the context of the other figures in this description. However, it will be understood that method 100 can be performed by any system, environment, software, and hardware, or a combination of systems, environments, software, and hardware, as appropriate. In some implementations, various steps of method 100 can be run in parallel, in combination, in loops, or in any order. The described method 100 can be applied to a 4D seismic data set, and results of various steps of the method 100 are illustrated in FIGS. 2-6.

At 102, two recorded seismic data sets (or field data sets) are received. For example, data sets of two 3D surveys from a 4D seismic survey can be selected and denoted as F1 and F2, respectively. In some cases, a baseline survey and a monitor survey can be selected. A 4D seismic survey can include repeated 3D seismic surveys at different times, separated by months or even years, at a same site or reservoir. In some cases, a same or similar acquisition geometry (such as the same source locations and receiver locations) is used for the repeated 3D surveys. A baseline survey can be performed before gas or water is injected into the reservoir, while a monitor survey is performed during or after the gas or water is injected into the reservoir. The data sets F1 and F2 can be based on a same or similar acquisition geometry. The data sets F1 and F2 can include recorded seismic traces from all sources and receivers. In some cases, F1 and F2 can be any two recorded seismic data sets. From 102, method 100 proceeds to 104.

At 104, a first synthetic data set (denoted as S1) of synthetic seismic event(s) is generated. The data set S1 can be generated in the pre-stack domain based on an acquisition geometry same as that of the survey data sets F1 and F2. A synthetic event can be a hypothesized known reflection event, for example, due to a hypothesized boundary between two different subsurface layers. The synthetic data set S1 includes simulated traces from all sources and receivers due to reflection event(s) of the hypothesized boundary(ies). Seismic data of synthetic event(s) can be generated using various methods, for example a basic method such as convolutional modeling or a complex method such as finite difference modeling.

Convolutional modeling is a process by which a wavelet is convolved with a set of reflection coefficients associated with boundaries between different layers. For example, it can be assumed that the earth (for example, few kilometers below the surface) consists of horizontal layers such that each layer has its own velocity (v), density ($\rho$), and seismic impedance (I=v*$\rho$). The reflection coefficient (R) of a boundary between two layers can be determined by the seismic impedances of the two layers. For example, the seismic impedance of the layer above the boundary is I1=v1*$\rho$1, and the seismic impedance of the layer below the boundary is I2=v2*$\rho$2. As a result, the reflection coefficient of the boundary can be calculated as R=(I2−I1)/(I1+I2). A hypothesized boundary can have a known reflection coefficient. Seismic data of a synthetic event caused by the hypothesized boundary can be generated by multiplying a known wavelet (or waveform) with the known reflection coefficient of the hypothesized boundary, and shifting by a time delay corresponding to the travel time when a wave travels from a source to the hypothesized boundary to a receiver. If multiple synthetic events are modelled, synthetic data (that is, seismic data of a synthetic event) is generated for each synthetic event and data of multiple synthetic events are added.

In some cases, finite difference modeling is used to generate synthetic data for the synthetic event(s). For example, finite difference modeling can be used to solve a partial differential equation (wave equation) to model the seismic wave propagation and interaction with different boundaries within the earth. From 104, method 100 proceeds to 106.

Figure 2A:
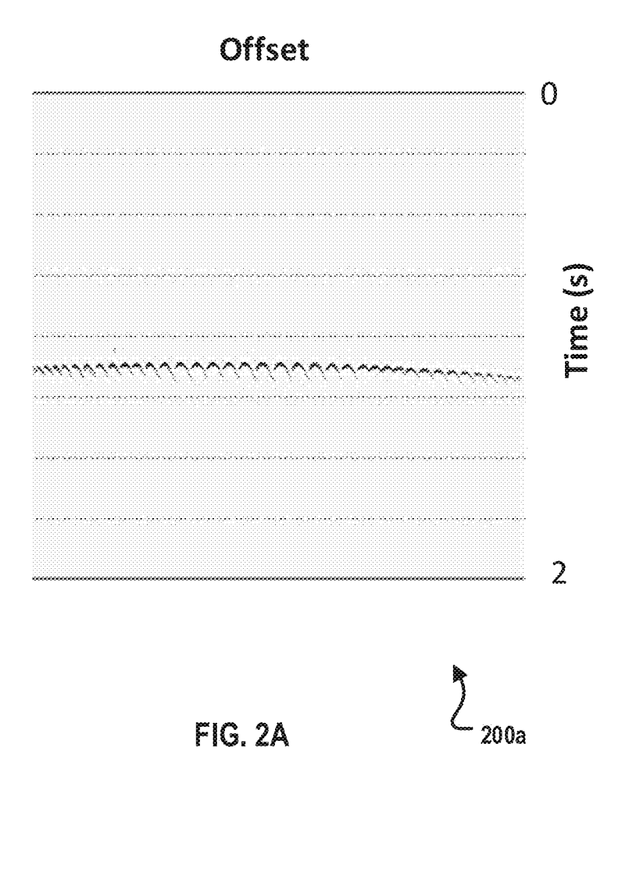
FIGS. 2A and 2B illustrate synthetic data corresponding to a synthetic event, according to some implementations of the present disclosure.
Figure 2B:
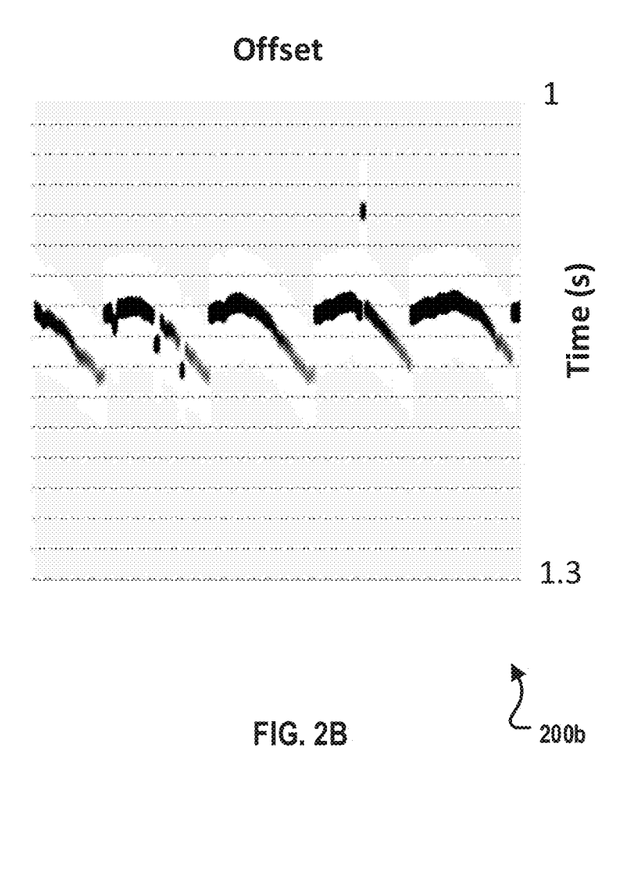

FIGS. 2A and 2B illustrate synthetic data corresponding to a synthetic event, according to some implementations of the present disclosure. FIG. 2A illustrates a synthetic data set 200*a* of a synthetic event due to reflection from a hypothesized subsurface boundary. FIG. 2B illustrates a zoomed version 200*b* of the synthetic data set 200*a*. In FIGS. 2A and 2B, the vertical axis indicates a two-way traveltime, and the horizontal axis indicates the shot offset (that is, the distance between the source and the receiver). The data set 200*a* is generated by placing a 25 Hertz (Hz) Ricker wavelet at a time above the reservoir of interest (at about 1.1 seconds as shown in FIG. 2A) and removing normal move-out according to a field stacking velocity model. The geometry of the synthetic data set 200*a* is the same as the recorded field data (that is, F1 or F2). The zoomed data set 200*b* in FIG. 2B illustrates synthetic seismic data after de-applying statics and surface consistent amplitude scalars to the synthetic data set 200*a*.

Back to FIG. 1, at 106, a second synthetic data set (denoted as S2) is generated by scaling seismic traces of selective common depth points (CDPs) in the first synthetic data set S1. In some implementations, a copy of the first synthetic data set S1 is made, and certain CDPs are selected. For the copied version, seismic traces in the selected CDPs are scaled by a scalar (or scaling factor) representing a realistic level of amplitude change expected from the reservoir. The scalar represents the 4D signal to be preserved during a seismic processing workflow. In some cases, as will be discussed in FIG. 3, multiple scalars can be used and different CDPs can be applied with different scalars. In some cases, the selected CDPs can be those CDPs surrounding the injecting well that injects gas or water into the reservoir. The CDPs can also be randomly selected. In some implementations, the scalars can be pre-determined from a feasibility study or from published monitoring studies in the literature. Simple rock physics modeling and fluid substitution can also be used to determine the expected amplitude change caused, for instance, by changing the fluid filling the pore space of the rock. From 106, method 100 proceeds to 108.

Figure 3:
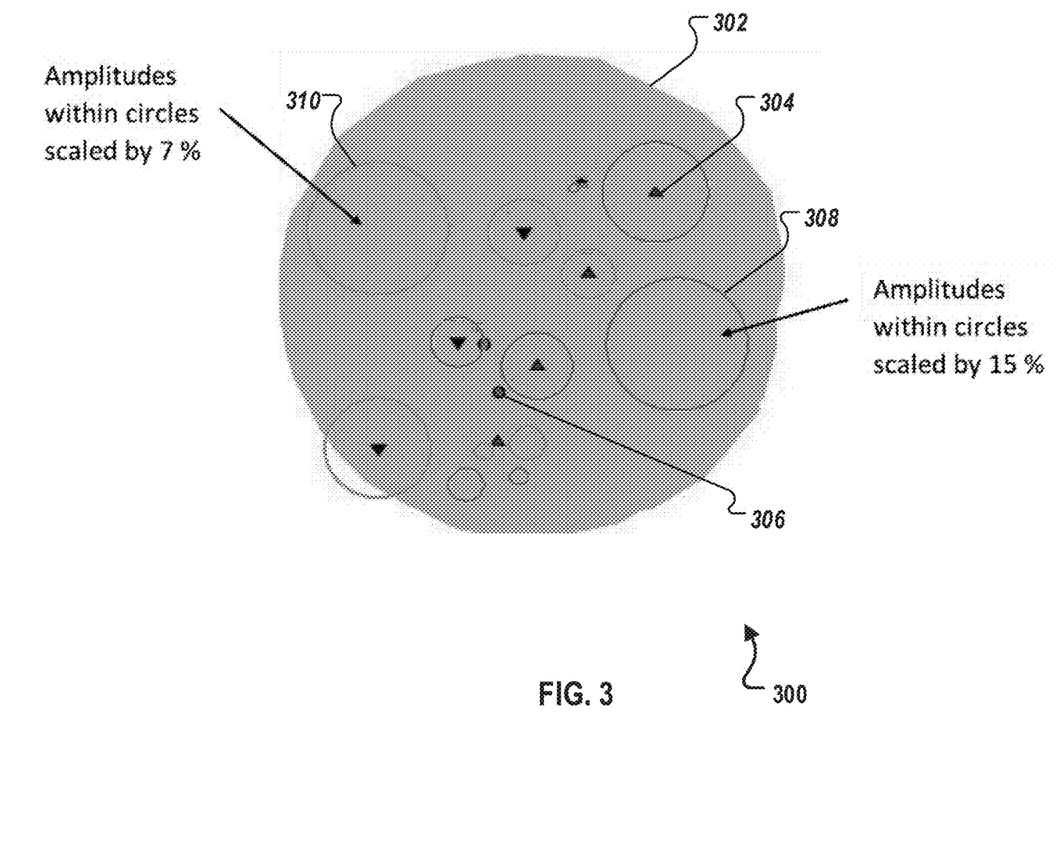
FIG. 3 illustrates a scaling map for a four-dimensional (4D) synthetic signal, according to some implementations of the present disclosure.

FIG. 3 illustrates a scaling map 300 for a 4D synthetic signal, according to some implementations of the present disclosure. The blue color area 302 represents a spatial extent of the subsurface coverage of the reservoir. Each trace in the synthetic data set S1 can correspond to a CDP, where the x-coordinate and the y-coordinate of the CDP is the x-coordinate and the y-coordinate of the middle point between the source and the receiver of the trace. In other words, the blue color area 302 represents the x-coordinates and the y-coordinates of all CDPs of the synthetic data set S1. The triangles in FIG. 3 (such as 304) represent injecting or producing wells, while small red dots (such as 306) represent monitoring wells. Traces having CDPs falling within pink circles (such as 308) are scaled by 15% in amplitudes, and traces having CDPs within green circles (such as 310) are scaled by 7% in amplitudes. The pink circles and the green circles are determined so that these circles surround most of the wells in addition to some circles that are away from the wells. In other words, the second synthetic data set S2 is obtained by scaling the amplitudes of the first synthetic data set S1 according to FIG. 3.

Back to FIG. 1, at 108, the synthetic data sets S1 and S2 are modified by de-applying processing parameters derived from the field data sets F1 and F2. For example, for each of the two synthetic data sets S1 and S2, datum and residual statics, surface consistent amplitude scalars, and normal move-out correction based on analysis from the field data set F1 and F2, that will be applied during a processing workflow, are de-applied. For example, processing parameters (such as parameters related to datum and residual statics, surface consistent amplitude scalars, and normal move-out correction) are derived from F1, and these processing parameters are de-applied to S1. Similarly, S2 is de-applied with the processing parameters derived from F2. The modified S1 and S2 are denoted as S1' and S2'. From 108, method 100 proceeds to 110.

At 110, a first combined data set (denoted as M1) and a second combined data set (denoted as M2) are generated by adding the synthetic data sets and the field data sets. In other words, M1=F1+S1' and M2=F2+S2'. From 110, method 100 proceeds to 112.

Figure 4A:
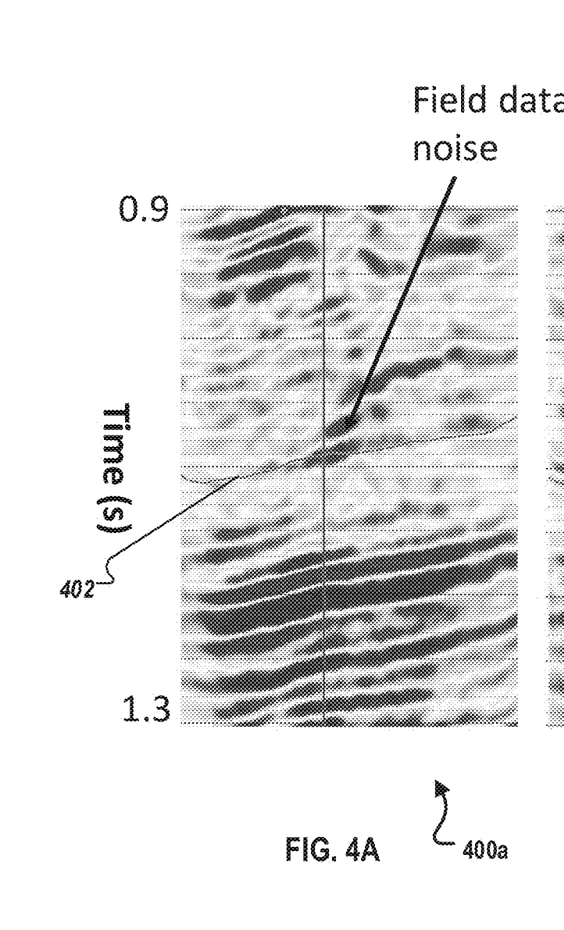
FIGS. 4A and 4B illustrate combined data sets, according to some implementations of the present disclosure.
Figure 4B:
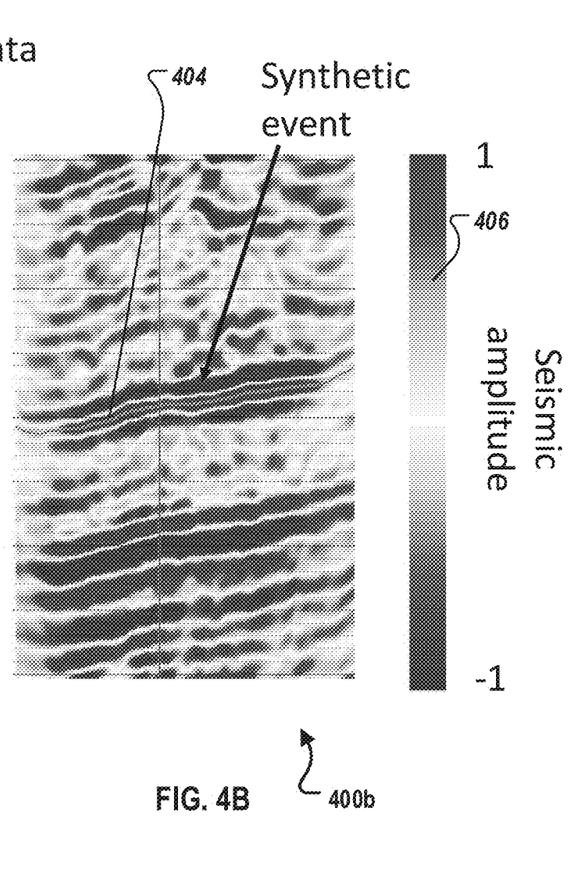

FIGS. 4A and 4B illustrate combined data sets, according to some implementations of the present disclosure. In FIGS. 4A and 4B, the vertical axes represent a two-way traveltime, while the horizontal axes represent CDP positions which extend for approximately three kilometers. Color bar 406 depicts a mapping between colors of a color spectrum and a continuous range of a seismic amplitude. FIG. 4A illustrates stacked data 400*a* for the field data set (for example, F1), while FIG. 4B illustrates stacked data 400*b* for the combined data set (for example, M1). The input to the stacking operation is all traces from sources and receivers. Traces associated with a same CDP position are stacked (or added) together. In some cases, FIGS. 4A and 4B can be considered as two-dimensional (2D) sections of the subsurface. FIGS. 4A and 4B show that the synthetic event (green lines 402 and 404 indicate the peak of the synthetic event) is located above the reservoir of interest (at about time 1100 milliseconds (ms)).

Back to FIG. 1, at 112, a seismic processing workflow is applied to the combined data sets M1 and M2, respectively. The seismic processing workflow can include one or more steps, for example, noise attenuation, deconvolution, datum statics correction, residual statics correction, trim statics correction, surface consistent amplitude correction, normal move-out correction, common-midpoint stacking, or migration. From 112, method 100 proceeds to 114.

At 114, a determination is made whether the processing workflow can preserve the signal amplitude changes between F1 and F2 (or whether the processing workflow is 4D compliant). In some cases, after each processing step of the processing workflow, metrics (for example, a normalized root mean square (NRMS) difference map as discussed later) can be calculated to determine whether that processing step is 4D compliant. After the last step of the processing workflow, metrics can be calculated to determine whether the processing workflow is 4D compliant. For example, a processing step or workflow is applied on M1 and the resultant data is denoted as Q1. The same processing step or workflow is applied on M2 and the resultant data is denoted as Q2. As will be shown in FIGS. 5A-6, a metric such as an NRMS difference map can be computed between Q1 and Q2. The NRMS difference map includes NRMS difference values for the data sets Q1 and Q2 at different CDP positions. If the difference values indicated in the NRMS difference map are similar to the scalar(s) specified at 106 (or within a threshold from the scalar(s) at 106), the processing step or workflow is considered to be 4D compliant.

In some cases, the NRMS difference map for the data sets Q1 and Q2 can be constructed over a given time window (for example, a time window of 50 ms around the synthetic event) by taking the difference between the data sets Q1 and Q2 on a trace-by-trace basis. For example, the NRMS difference value can be computed as:

NRMS difference value=2*RMS($Q1-Q2$)/((RMS($Q1$)+RMS($Q2$)), where RMS( ) represents root-mean-square over the time window. In some cases, traces in Q1 and Q2 can be stacked based on CDP positions. For example, traces in Q1 corresponding to a particular CDP position are stacked together to become a first stacked trace. Similarly, traces in Q2 corresponding to the particular CDP position are stacked together to become a second stacked trace. For the first and the second stacked traces, trace portions within a time window around the synthetic event are extracted. The RMS of the difference between the two extracted trace portions is calculated and further normalized by the average RMS energy of the first and the second stacked traces. The NRMS difference value can range from 0% (indicating perfect repeatability) to 200% (indicating the worst-case repeatability and that the two data volumes have opposite polarity). After 114, method 100 stops.

Figure 5A:
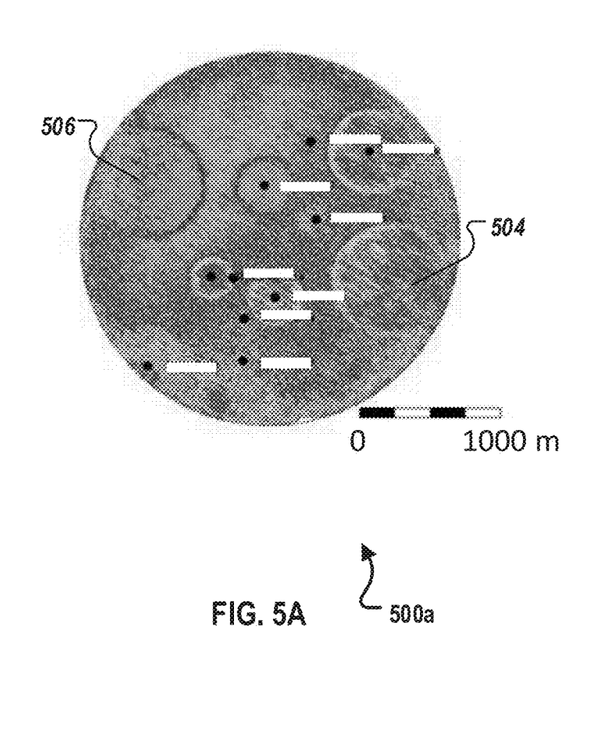
FIGS. 5A and 5B illustrate impact of two different noise attenuation methods on a synthetic 4D signal, according to some implementations of the present disclosure.
Figure 5B:
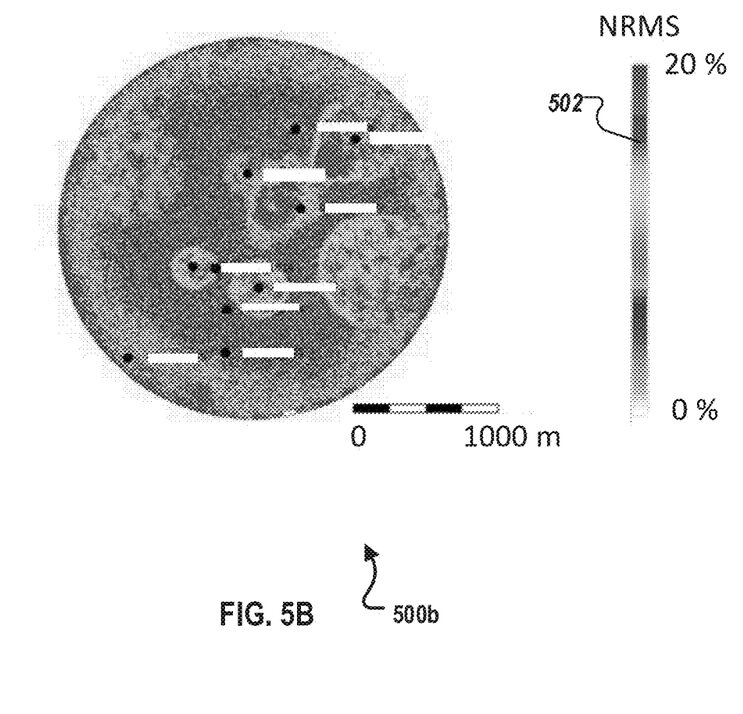

FIGS. 5A and 5B illustrate impact of two different noise attenuation methods on a synthetic 4D signal, according to some implementations of the present disclosure. In some cases, noise attenuation can be one of the first stages in a seismic processing workflow. Both combined data sets (M1 and M2) are processed using two noise attenuation methods. An NRMS difference map is computed after each of the noise attenuation method is applied on M1 and M2. FIG. 5A illustrates the NRMS difference map 500a for the first noise attenuation method, while FIG. 5B illustrates the NRMS difference map 500b for the second noise attenuation method. Color bar 502 depicts a mapping between colors of a color spectrum and a continuous range of an NRMS difference value. FIG. 5A shows that the first noise attenuation method has largely maintained the synthetic 4D signal. For example, the pink area 504 indicates NRMS difference values of about 15%, while the green area 506 indicates NRMS difference values of about 7%, which are similar to the scaling values 15% and 7% in FIG. 3. Further, the area 504 has a similar shape and size as the circle 308, while the area 506 has a similar shape and size as the circle 310. Therefore, the first noise attenuation method is considered to be 4D compliant which preserves the synthetic 4D signal.

FIG. 5B, however, shows a large negative impact on the anomalies towards the north and significant artifacts in the synthetic 4D signal. Therefore, the second noise attenuation method is not considered to be 4D compliant.

The described approach can be used on other processing steps of a seismic processing workflow. For example, after applying a seismic processing workflow (for instance, from noise attenuation to final stacking) on the combined datasets M1 and M2, an NRMS difference map can be computed to see if the synthetic 4D signal is preserved. The described method may not assess the impact of surface consistent corrections (such as amplitude scalars, deconvolution operators, and residual statics). In some cases, residual 4D noise may still remain when the data is at an early stage of the processing workflow.

Figure 6:
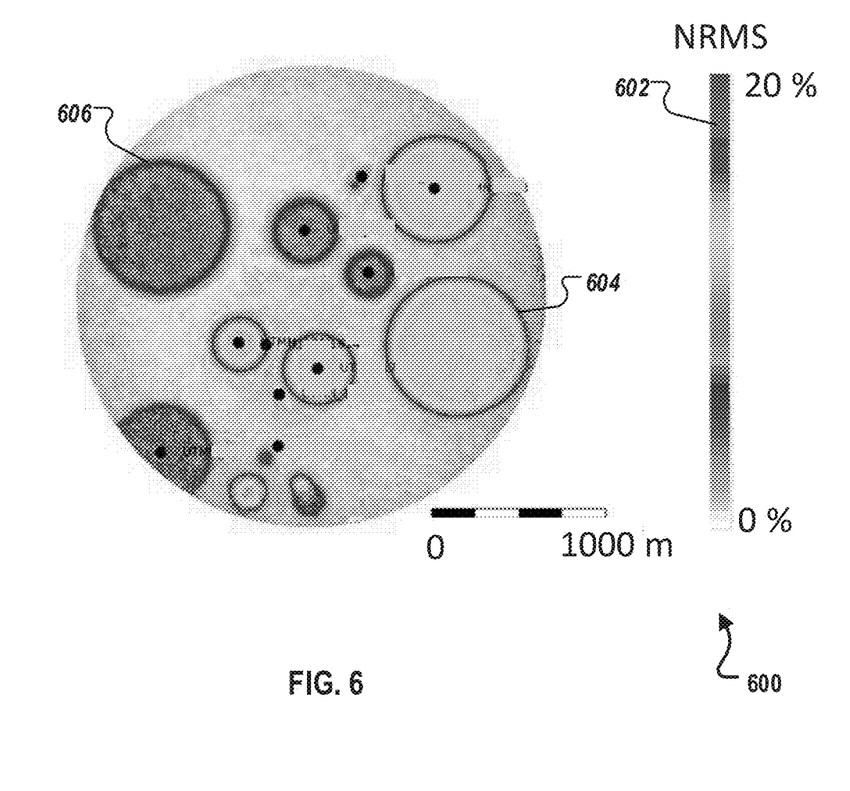
FIG. 6 illustrates a normalized root mean square (NRMS) difference map after applying a particular seismic processing workflow on a baseline survey and a monitor survey, according to some implementations of the present disclosure.

FIG. 6 illustrates an NRMS difference map 600 after applying a particular seismic processing workflow on a baseline survey and a monitor survey, according to some implementations of the present disclosure. The particular seismic processing workflow includes the first noise attenuation method of FIG. 5A. Color bar 602 depicts a mapping between colors of a color spectrum and a continuous range of an NRMS difference value. FIG. 6 shows that the particular processing workflow has largely preserved the synthetic 4D signal added to the field data with some minor smearing on the edge of the circles (such as circles 604 and 606). For example, the yellow-red color within the circle 604 indicates NRMS difference values of about 13%, which is close to the scaling value 15% in FIG. 3. The yellow-blue color within the circle 606 indicates NRMS difference values of about 7%, which is similar to the scaling value 7% in FIG. 3. Further, the area within the circle 604 has a similar shape and size as the circle 308, while the area within the circle 606 has a similar shape and size as the circle 310. Therefore, the particular processing workflow is considered to be 4D compliant.

In some cases, after determining that a seismic processing workflow is 4D compliant, that processing workflow can be applied to the baseline survey data and the monitor survey data to generate two subsurface images (or seismic images). The two subsurface images can be displayed, for example, on a user interface. The two subsurface images corresponding to the baseline survey and the monitor survey can be used to analyze, for example, changes in reservoir fluid. Based on changes in the reservoir fluid, drilling parameters for hydrocarbon wells can be determined or adjusted. The determined drilling parameters can be displayed, for example, on a user interface.

The described approach can also be extended to conventional seismic processing (for example, 3D seismic processing that is not related to time-lapse) for an evaluation of whether a seismic processing preserves relative seismic amplitudes. In some cases, a land seismic processing that involves heavy noise removal and other steps may introduce significant modification to seismic amplitudes. Using the described approach, the processing workflow can be evaluated to determine whether relative seismic amplitude changes are preserved. For example, one potential application is to assess the impact of processing on amplitude versus offset (AVO) analysis for one seismic survey. A pre-stack synthetic event with a certain class of amplitude change with offset (for example, a Class III response shows increasing amplitudes with offset) is added to the acquired field data and processed through a processing workflow. The amplitudes are assessed at the end of the workflow, either using pre-stack gathers or through partial angle stacks, to determine if the synthetic Class III event has been preserved.

Figure 7:
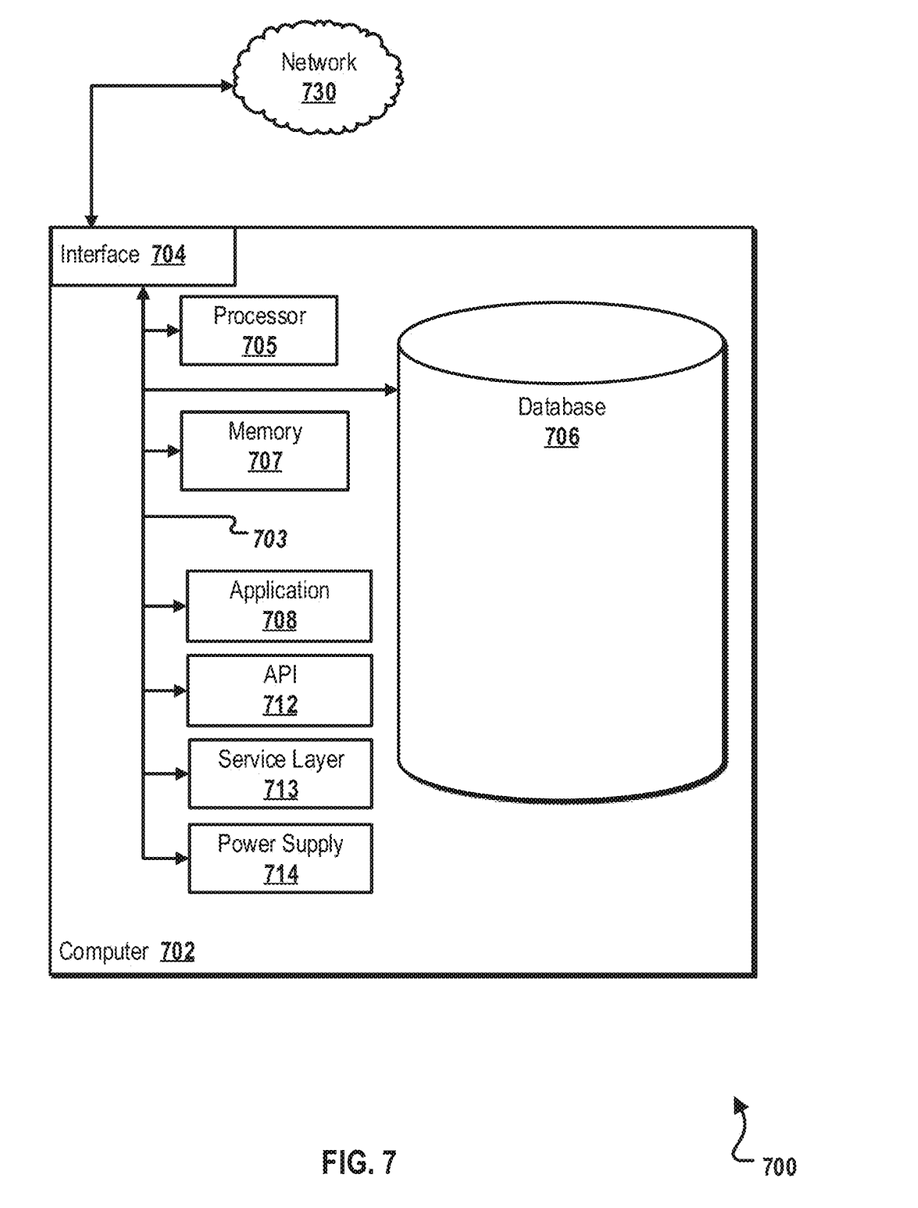
FIG. 7 is a block diagram illustrating an example of a computer-implemented system used to provide computational functionalities associated with described algorithms, methods, functions, processes, flows, and procedures, according to some implementations of the present disclosure.

FIG. 7 is a block diagram illustrating an example of a computer-implemented system 700 used to provide computational functionalities associated with described algorithms, methods, functions, processes, flows, and procedures, according to some implementations of the present disclosure. In the illustrated implementation, system 700 includes a computer 702 and a network 730.

The illustrated computer 702 is intended to encompass any computing device such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the computer 702 can include an input device, such as a keypad, keyboard, touch screen, or a combination of input devices that can accept user information, and an output device that conveys information associated with the operation of the computer 702 (for example, conveying digital data, visual, audio, or a combination of types of information on a graphical-type user interface (UI) (or GUI) or other UI).

The computer 702 can serve in a role in a distributed computing system as a client, network component, a server, a database, or a combination of roles for performing the subject matter described in the present disclosure. The illustrated computer 702 is communicably coupled with a network 730. In some implementations, one or more components of the computer 702 can be configured to operate within an environment, including cloud-computing-based, local, global, or a combination of environments.

The computer 702 is an electronic computing device operable to receive, transmit, process, store, or manage data and information associated with the described subject matter. According to some implementations, the computer 702 can also include or be communicably coupled with a server, including an application server, e-mail server, web server, caching server, streaming data server, or a combination of servers.

The computer 702 can receive requests over network 730 (for example, from a client software application executing on another computer 702) and respond to the received requests by processing the received requests using a software application or a combination of software applications. In addition, requests can also be sent to the computer 702 from internal users (for example, from a command console or by another internal access method), external or third-parties, or other entities, individuals, systems, or computers.

Each of the components of the computer 702 can communicate using a system bus 703. In some implementations, any or all of the components of the computer 702, including hardware, software, or a combination of hardware and software, can interface over the system bus 703 using an application programming interface (API) 712, a service layer 713, or a combination of the API 712 and service layer 713. The API 712 can include specifications for routines, data structures, and object classes. The API 712 can be either computer-language independent or dependent and refer to a complete interface, a single function, or even a set of APIs. The service layer 713 provides software services to the computer 702 or other components (whether illustrated or not) that are communicably coupled to the computer 702. The functionality of the computer 702 can be accessible for all service consumers using the service layer 713. Software services, such as those provided by the service layer 713, provide reusable, defined functionalities through a defined interface. For example, the interface can be software written in JAVA, C++, or a combination of computing languages providing data in extensible markup language (XML) format, or a combination of formats. While illustrated as an integrated component of the computer 702, alternative implementations can illustrate the API 712 or the service layer 713 as stand-alone components in relation to other components of the computer 702 or other components (whether illustrated or not) that are communicably coupled to the computer 702. Moreover, any or all parts of the API 712 or the service layer 713 can be implemented as a child or a sub-module of another software module, enterprise application, or hardware module without departing from the scope of the present disclosure.

The computer 702 includes an interface 704. Although illustrated as a single interface 704, two or more interfaces 704 can be used according to particular needs, desires, or particular implementations of the computer 702. The interface 704 is used by the computer 702 for communicating with another computing system (whether illustrated or not) that is communicatively linked to the network 730 in a distributed environment. Generally, the interface 704 is operable to communicate with the network 730 and includes logic encoded in software, hardware, or a combination of software and hardware. More specifically, the interface 704 can include software supporting one or more communication protocols associated with communications such that the network 730 or hardware of interface 704 is operable to communicate physical signals within and outside of the illustrated computer 702.

The computer 702 includes a processor 705. Although illustrated as a single processor 705, two or more processors 705 can be used according to particular needs, desires, or particular implementations of the computer 702. Generally, the processor 705 executes instructions and manipulates data to perform the operations of the computer 702 and any algorithms, methods, functions, processes, flows, and procedures as described in the present disclosure.

The computer 702 also includes a database 706 that can hold data for the computer 702, another component communicatively linked to the network 730 (whether illustrated or not), or a combination of the computer 702 and another component. For example, database 706 can be an in-memory or conventional database storing data consistent with the present disclosure. In some implementations, database 706 can be a combination of two or more different database types (for example, a hybrid in-memory and conventional database) according to particular needs, desires, or particular implementations of the computer 702 and the described functionality. Although illustrated as a single database 706, two or more databases of similar or differing types can be used according to particular needs, desires, or particular implementations of the computer 702 and the described functionality. While database 706 is illustrated as an integral component of the computer 702, in alternative implementations, database 706 can be external to the computer 702.

The computer 702 also includes a memory 707 that can hold data for the computer 702, another component or components communicatively linked to the network 730 (whether illustrated or not), or a combination of the computer 702 and another component. The memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707, two or more memories 707 or similar or differing types can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in the present disclosure. For example, application 708 can serve as one or more components, modules, or applications. Further, although illustrated as a single application 708, the application 708 can be implemented as multiple applications 708 on the computer 702. In addition, although illustrated as integral to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion or management circuits (including recharging, standby, or another power management functionality). In some implementations, the power supply 714 can include a power plug to allow the computer 702 to be plugged into a wall socket or another power source to, for example, power the computer 702 or recharge a rechargeable battery.

There can be any number of computers 702 associated with, or external to, a computer system containing computer 702, each computer 702 communicating over network 730. Further, the term "client," "user," or other appropriate terminology can be used interchangeably, as appropriate, without departing from the scope of the present disclosure. Moreover, the present disclosure contemplates that many users can use one computer 702, or that one user can use multiple computers 702.

Described implementations of the subject matter can include one or more features, alone or in combination.

For example, in a first implementation, a computer-implemented method includes receiving a first seismic data set and a second seismic data set of a reservoir. A first synthetic data set and a second synthetic data set are generated, where the second synthetic data set is generated by multiplying at least a portion of data in the first synthetic data set by a scaling factor. A first combined data set and a second combined data set are generated, where the first combined data set is generated by adding the first seismic data set and the first synthetic data set, and the second combined data set is generated by adding the second seismic data set and the second synthetic data set. A first processed data set and a second processed data set are generated by applying a seismic processing step on the first combined data set and the second combined data set, respectively. A difference factor between the first processed data set and the second processed data set is calculated. Based on the difference factor and the scaling factor, it is determined whether the seismic processing step is able to preserve signal amplitude changes between the first seismic data set and the second seismic data set.

The foregoing and other described implementations can each, optionally, include one or more of the following features:

A first feature, combinable with any of the following features, where the first seismic data set and the second seismic data set represent seismic data of the reservoir acquired at two different times using a same acquisition geometry.

A second feature, combinable with any of the previous or following features, where the first synthetic data is generated based on a known hypothesized reflection event.

A third feature, combinable with any of the previous or following features, where the first synthetic data is generated using a same acquisition geometry as the first seismic data set and the second seismic data set.

A fourth feature, combinable with any of the previous or following features, where the seismic processing step is able to preserve signal amplitude changes if a difference between the difference factor and the scaling factor is less than a threshold.

A fifth feature, combinable with any of the previous or following features, where the method further includes determining a first processing parameter based on the first seismic data and determining a second processing parameter based on the second seismic data. The first synthetic data set is modified based on the first processing parameter, and the second synthetic data set is modified based on the second processing parameter. The first combined data set and the second combined data set are generated using the modified first synthetic data set and the modified second synthetic data set.

A sixth feature, combinable with any of the previous features, where the method further includes, in response to determining that the seismic processing step is able to preserve signal amplitude changes, generating a first seismic image after applying the seismic processing step on the first seismic data and generating a second seismic image after applying the seismic processing step on the second seismic data. The first seismic image and the second seismic image are displayed. Based on the first seismic image and the second seismic image, drilling parameters for hydrocarbon wells are generated. The drilling parameters are displayed.

In a second implementation, a non-transitory, computer-readable medium stores one or more instructions executable by a computer system to perform operations including receiving a first seismic data set and a second seismic data set of a reservoir. A first synthetic data set and a second synthetic data set are generated, where the second synthetic data set is generated by multiplying at least a portion of data in the first synthetic data set by a scaling factor. A first combined data set and a second combined data set are generated, where the first combined data set is generated by adding the first seismic data set and the first synthetic data set, and the second combined data set is generated by adding the second seismic data set and the second synthetic data set. A first processed data set and a second processed data set are generated by applying a seismic processing step on the first combined data set and the second combined data set, respectively. A difference factor between the first processed data set and the second processed data set is calculated. Based on the difference factor and the scaling factor, it is determined whether the seismic processing step is able to preserve signal amplitude changes between the first seismic data set and the second seismic data set.

The foregoing and other described implementations can each, optionally, include one or more of the following features:

A first feature, combinable with any of the following features, where the first seismic data set and the second seismic data set represent seismic data of the reservoir acquired at two different times using a same acquisition geometry.

A second feature, combinable with any of the previous or following features, where the first synthetic data is generated based on a known hypothesized reflection event.

A third feature, combinable with any of the previous or following features, where the first synthetic data is generated using a same acquisition geometry as the first seismic data set and the second seismic data set.

A fourth feature, combinable with any of the previous or following features, where the seismic processing step is able to preserve signal amplitude changes if a difference between the difference factor and the scaling factor is less than a threshold.

A fifth feature, combinable with any of the previous or following features, where the operations further include determining a first processing parameter based on the first seismic data and determining a second processing parameter based on the second seismic data. The first synthetic data set is modified based on the first processing parameter, and the second synthetic data set is modified based on the second processing parameter. The first combined data set and the second combined data set are generated using the modified first synthetic data set and the modified second synthetic data set.

A sixth feature, combinable with any of the previous features, where the operations further include, in response to determining that the seismic processing step is able to preserve signal amplitude changes, generating a first seismic image after applying the seismic processing step on the first seismic data and generating a second seismic image after applying the seismic processing step on the second seismic data. The first seismic image and the second seismic image are displayed. Based on the first seismic image and the second seismic image, drilling parameters for hydrocarbon wells are generated. The drilling parameters are displayed.

In a third implementation, a computer-implemented system includes one or more computers, and one or more computer memory devices interoperably coupled with the one or more computers and having tangible, non-transitory, machine-readable media storing one or more instructions. When executed by the one or more computers, the one or more instructions perform one or more operations including receiving a first seismic data set and a second seismic data set of a reservoir. A first synthetic data set and a second synthetic data set are generated, where the second synthetic data set is generated by multiplying at least a portion of data in the first synthetic data set by a scaling factor. A first combined data set and a second combined data set are generated, where the first combined data set is generated by adding the first seismic data set and the first synthetic data set, and the second combined data set is generated by adding the second seismic data set and the second synthetic data set. A first processed data set and a second processed data set are generated by applying a seismic processing step on the first combined data set and the second combined data set, respectively. A difference factor between the first processed data set and the second processed data set is calculated. Based on the difference factor and the scaling factor, it is determined whether the seismic processing step is able to preserve signal amplitude changes between the first seismic data set and the second seismic data set.

The foregoing and other described implementations can each, optionally, include one or more of the following features:

A first feature, combinable with any of the following features, where the first seismic data set and the second seismic data set represent seismic data of the reservoir acquired at two different times using a same acquisition geometry.

A second feature, combinable with any of the previous or following features, where the first synthetic data is generated based on a known hypothesized reflection event.

A third feature, combinable with any of the previous or following features, where the first synthetic data is generated using a same acquisition geometry as the first seismic data set and the second seismic data set.

A fourth feature, combinable with any of the previous or following features, where the seismic processing step is able to preserve signal amplitude changes if a difference between the difference factor and the scaling factor is less than a threshold.

A fifth feature, combinable with any of the previous features, where the one or more operations further include determining a first processing parameter based on the first seismic data and determining a second processing parameter based on the second seismic data. The first synthetic data set is modified based on the first processing parameter, and the second synthetic data set is modified based on the second processing parameter. The first combined data set and the second combined data set are generated using the modified first synthetic data set and the modified second synthetic data set.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages. The computer program can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices (for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices), magnetic devices, (for example, tape, cartridges, cassettes, and internal/removable disks), magneto-optical disks, and optical memory devices (for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD)). The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component (for example, as a data server), or that includes a middleware component (for example, an application server), or that includes a front-end component (for example, a client computer having a graphical user interface or a Web browser through which a user can interact with an implementation of the subject matter described in this specification), or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, or a combination of communication networks. The communication network can communicate, for example, Internet Protocol (IP) packets, Frame Relay frames, Asynchronous Transfer Mode (ATM) cells, voice, video, or data, between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations of particular concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method, a non-transitory, computer-readable medium storing computer-readable instructions to perform the computer-implemented method, and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving, by a hardware processor, a first seismic data set and a second seismic data set of a reservoir;
   generating, by the hardware processor, a first synthetic data set and a second synthetic data set, wherein the second synthetic data set is generated by multiplying at least a portion of data in the first synthetic data set by a scaling factor;
   modifying, by the hardware processor, the first and second seismic synthetic data sets by de-applying processing parameters derived from the first and second seismic data sets;
   generating, by the hardware processor, a first combined data set and a second combined data set, wherein the first combined data set is generated by adding the first seismic data set and the modified first synthetic data set, and the second combined data set is generated by adding the second seismic data set and the modified second synthetic data set;
   generating, by the hardware processor, a first processed data set and a second processed data set, wherein the first processed data set is generated by applying a seismic processing step on the first combined data set, and the second processed data set is generated by applying the seismic processing step on the second combined data set;
   calculating, by the hardware processor, a difference factor between the first processed data set and the second processed data set; and
   based on the difference factor and the scaling factor, determining, by the hardware processor, whether the seismic processing step is able to preserve signal amplitude changes between the first seismic data set and the second seismic data set, wherein the seismic processing step is able to preserve signal amplitude changes if a difference between the difference factor and the scaling factor is less than a threshold.

2. The computer-implemented method of claim 1, wherein the first seismic data set and the second seismic data set represent seismic data of the reservoir acquired at two different times using a same acquisition geometry.

3. The computer-implemented method of claim 1, wherein the first synthetic data is generated based on a known hypothesized reflection event.

4. The computer-implemented method of claim 1, wherein the first synthetic data is generated using a same acquisition geometry as the first seismic data set and the second seismic data set.

5. The computer-implemented method of claim 1, wherein modifying, by the hardware processor, the first and second seismic synthetic data sets by de-applying processing parameters derived from the first and second seismic data sets comprises:
   determining a first processing parameter based on the first seismic data;
   determining a second processing parameter based on the second seismic data;
   modifying the first synthetic data set based on the first processing parameter; and
   modifying the second synthetic data set based on the second processing parameter.

6. The computer-implemented method of claim 1, further comprising, in response to determining that the seismic processing step is able to preserve signal amplitude changes:
   generating a first seismic image after applying the seismic processing step on the first seismic data;
   generating a second seismic image after applying the seismic processing step on the second seismic data;
   displaying the first seismic image and the second seismic image;
   based on the first seismic image and the second seismic image, generating drilling parameters for hydrocarbon wells; and
   displaying the drilling parameters.

7. A non-transitory, computer-readable medium storing one or more instructions executable by a computer system to perform operations comprising:
   receiving a first seismic data set and a second seismic data set of a reservoir;
   generating a first synthetic data set and a second synthetic data set, wherein the second synthetic data set is generated by multiplying at least a portion of data in the first synthetic data set by a scaling factor;
   modifying the first and second seismic synthetic data sets by de-applying processing parameters derived from the first and second seismic data sets;
   generating a first combined data set and a second combined data set, wherein the first combined data set is generated by adding the first seismic data set and the modified first synthetic data set, and the second combined data set is generated by adding the second seismic data set and the modified second synthetic data set;
   generating a first processed data set and a second processed data set, wherein the first processed data set is generated by applying a seismic processing step on the first combined data set, and the second processed data set is generated by applying the seismic processing step on the second combined data set;
   calculating a difference factor between the first processed data set and the second processed data set; and
   based on the difference factor and the scaling factor, determining whether the seismic processing step is able to preserve signal amplitude changes between the first seismic data set and the second seismic data set, wherein the seismic processing step is able to preserve signal amplitude changes if a difference between the difference factor and the scaling factor is less than a threshold.

8. The non-transitory, computer-readable medium of claim 7, wherein the first seismic data set and the second seismic data set represent seismic data of the reservoir acquired at two different times using a same acquisition geometry.

9. The non-transitory, computer-readable medium of claim 7, wherein the first synthetic data is generated based on a known hypothesized reflection event.

10. The non-transitory, computer-readable medium of claim 7, wherein the first synthetic data is generated using a same acquisition geometry as the first seismic data set and the second seismic data set.

11. The non-transitory, computer-readable medium of claim 7, wherein modifying the first and second seismic synthetic data sets by de-applying processing parameters derived from the first and second seismic data sets comprises:
   determining a first processing parameter based on the first seismic data;
   determining a second processing parameter based on the second seismic data;
   modifying the first synthetic data set based on the first processing parameter; and
   modifying the second synthetic data set based on the second processing parameter.

12. The non-transitory, computer-readable medium of claim 7, wherein the operations further comprise, in response to determining that the seismic processing step is able to preserve signal amplitude changes:
   generating a first seismic image after applying the seismic processing step on the first seismic data;
   generating a second seismic image after applying the seismic processing step on the second seismic data;
   displaying the first seismic image and the second seismic image;
   based on the first seismic image and the second seismic image, generating drilling parameters for hydrocarbon wells; and
   displaying the drilling parameters.

13. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
   receiving a first seismic data set and a second seismic data set of a reservoir;
   generating a first synthetic data set and a second synthetic data set, wherein the second synthetic data set is generated by multiplying at least a portion of data in the first synthetic data set by a scaling factor;
   modifying the first and second seismic synthetic data sets by de-applying processing parameters derived from the first and second seismic data sets;

generating a first combined data set and a second combined data set, wherein the first combined data set is generated by adding the first seismic data set and the modified first synthetic data set, and the second combined data set is generated by adding the second seismic data set and the modified second synthetic data set;

generating a first processed data set and a second processed data set, wherein the first processed data set is generated by applying a seismic processing step on the first combined data set, and the second processed data set is generated by applying the seismic processing step on the second combined data set;

calculating a difference factor between the first processed data set and the second processed data set; and based on the difference factor and the scaling factor, determining whether the seismic processing step is able to preserve signal amplitude changes between the first seismic data set and the second seismic data set, wherein the seismic processing step is able to preserve signal amplitude changes if a difference between the difference factor and the scaling factor is less than a threshold.

14. The computer-implemented system of claim 13, wherein the first seismic data set and the second seismic data set represent seismic data of the reservoir acquired at two different times using a same acquisition geometry.

15. The computer-implemented system of claim 13, wherein the first synthetic data is generated based on a known hypothesized reflection event.

16. The computer-implemented system of claim 13, wherein the first synthetic data is generated using a same acquisition geometry as the first seismic data set and the second seismic data set.

17. The computer-implemented system of claim 13, wherein modifying the first and second seismic synthetic data sets by de-applying processing parameters derived from the first and second seismic data sets comprises:
   determining a first processing parameter based on the first seismic data;
   determining a second processing parameter based on the second seismic data;
   modifying the first synthetic data set based on the first processing parameter; and
   modifying the second synthetic data set based on the second processing parameter.

* * * * *